(12) United States Patent
Qian et al.

(10) Patent No.: US 7,801,365 B2
(45) Date of Patent: Sep. 21, 2010

(54) METHOD OF CODING A CONTINUOUS DATA FLOW USING VECTOR QUANTIZATION

(75) Inventors: Shen-En Qian, Brossard (CA); Allan B. Hollinger, Toronto (CA)

(73) Assignee: Canadian Space Agency, Ottawa, Ontario (CA)

( * ) Notice: Subject to any disclaimer, the term of this patent is extended or adjusted under 35 U.S.C. 154(b) by 0 days.

(21) Appl. No.: 12/453,426

(22) Filed: May 11, 2009

(65) Prior Publication Data

US 2009/0279805 A1  Nov. 12, 2009

Related U.S. Application Data

(62) Division of application No. 10/611,897, filed on Jul. 3, 2003, now Pat. No. 7,551,785.

(51) Int. Cl.
  *G06K 9/36* (2006.01)
  *G06K 9/00* (2006.01)
  *H04B 1/66* (2006.01)

(52) U.S. Cl. .................. 382/232; 382/103; 382/154; 382/166; 375/240

(58) Field of Classification Search .................. 382/103, 382/107, 154, 166, 232–253; 375/240, 240.22
See application file for complete search history.

(56) References Cited

U.S. PATENT DOCUMENTS 4,541,012 A * 9/1985 Tescher ................... 348/400.1

(Continued)

FOREIGN PATENT DOCUMENTS

EP      1209917 A2 *   5/2002

OTHER PUBLICATIONS

Qian et al; 3D data compression of hyperspectral imagery using vector quantization with NDVI-based multiple codebooks; IEEE Intl' Geoscience; Jul. 10, 1998, pp. 2680-2684 NY.
Cuhadar et al; A scalable parallel approach to vector quantization; Real-time Imaging, Academic Press Ltd.; Aug. 4, 1996 pp. 241-247; vol. 2 No. 4 UK.

(Continued)

*Primary Examiner*—Manav Seth
(74) *Attorney, Agent, or Firm*—Brion Raffoul

(57) ABSTRACT

Methods and systems for compressing a continuous data flow for numerous applications where it is necessary to process large data sets such as hyper-spectral data cubes in real-time. A predetermined number of 2D focal plane frames in a boundary area of a previous regional data cube close to a current regional data cube are included in a training set used for codevector training for the current region. Therefore, no artificial boundary occurs between the two adjacent regions when codevectors trained in this way are used for codebook generation and encoding of the spectral vectors of the current regional data cube. This process substantially reduces image artifacts between adjacent regions. A remedy for the single bit error problem is also provided. Full redundancy of compressed data for a regional data cube is obtained by combining a previous regional data cube and the current regional data cube for codebook training. In order to obtain redundancy for the index map, the codebook is used to encode the current regional data cube as well as the previous regional data cube producing a baseline index map for the current regional data cube and a redundant index map for the previous regional data cube. Therefore, full redundancy for a regional data cube is provided allowing restoration of a regional data cube even if its codebook and/or index map are corrupted or lost due to single bit errors.

10 Claims, 8 Drawing Sheets

U.S. PATENT DOCUMENTS

| | | | | |
|---|---|---|---|---|
| 4,862,261 | A | | 8/1989 | Tanaka .................... 348/422.1 |
| 4,933,761 | A | | 6/1990 | Murakami et al. ..... 375/240.22 |
| 4,963,030 | A | | 10/1990 | Makur .................. 375/240.22 |
| 5,086,439 | A | | 2/1992 | Asai et al. .................... 375/241 |
| 5,172,228 | A | * | 12/1992 | Israelsen ................ 375/240.22 |
| 5,204,899 | A | | 4/1993 | Israelsen et al. .......... 348/405.1 |
| 5,398,069 | A | * | 3/1995 | Huang et al. ........... 375/240.22 |
| 5,822,465 | A | | 10/1998 | Normile et al. |
| 5,828,413 | A | | 10/1998 | Jayant et al. ................. 382/253 |
| 5,982,441 | A | * | 11/1999 | Hurd et al. ............... 348/417.1 |
| 6,546,117 | B1 | * | 4/2003 | Sun et al. .................... 382/103 |
| 6,724,940 | B1 | * | 4/2004 | Qian et al. .................. 382/253 |
| 7,251,376 | B2 | * | 7/2007 | Qian et al. .................. 382/253 |
| 2008/0044098 | A1 | * | 2/2008 | Qian et al. .................. 382/253 |

OTHER PUBLICATIONS

Jianhua et al; An efficient parallel algorithm for vector quantizer design; 1994 Intl' Conference on Parallel Processing CRC Press, Boca Raton FL, pp. 25-30.

Thyagarajan et al; Image coding based on segmentation using region growing; Proceedings: ICASSP 87; 1987 Intl' conference on accoustics . . . processing, pp. 752-755 NY.

Motta et al;Partitioned vector quantization:applicationt o lossless compression of Hyperspectral images:IEEE Intl'conference on accoustics . . . processsing;Apr. 10, 2003 pp. 241-244 NJ.

Solaiman et al; Transmission errors recovery using fuzzy block similarity measures; Proceedings—Intl' conference Image processing . . . IEEE: Oct. 29, 1997 pp. 330-333 vol. 2.

Hung et al; Reconstruction of lost blocks using codeword estimation; IEEE transactions on consumer electronics; Nov. 4, 1999 pp. 1190-1199 vol. 45.

* cited by examiner

METHOD OF CODING A CONTINUOUS DATA FLOW USING VECTOR QUANTIZATION

This application is a divisional of U.S. patent application Ser. No. 10/611,897 filed 3 Jul. 2003 now U.S. Pat. No. 7,551,785.

FIELD OF THE INVENTION

The invention relates to data compression and more particularly to compression of a continuous flow of multidimensional data in real-time using vector quantization.

BACKGROUND OF THE INVENTION

The next generation of satellite-based remote sensing instruments will produce an unprecedented volume of data. Imaging spectrometers, also known as hyper-spectral imaging devices, are prime examples. They collect image data in hundreds of spectral bands simultaneously from the near ultraviolet to the short wave infrared, and are capable of providing direct identification of surface materials.

Hyper-spectral data thus collected are typically in the form of a three-dimensional (3D) data cube. Each data cube has two dimensions in the spatial domain defining a rectangular plane of image pixels, and a third dimension in the spectral domain defining radiance levels of multiple spectral bands per each image pixel. The volume and complexity of hyper-spectral data present a significant challenge to conventional transmission and image analysis methods.

Data compression using Vector Quantisation (VQ) has received much attention because of its promise of high compression ratio and relatively simple structure. The VQ procedure is known to have two main steps: codebook generation and codevector matching. VQ can be viewed as mapping a large set of vectors into a small set of indexed codevectors forming a codebook. During encoding, a search through a codebook is performed to find a best codevector to express each input vector. The index or address of the selected codevector in the codebook is stored associated with the input vector or the input vector location. Given two systems having a same codebook, transmission of the index to a decoder over a communication channel from the first system to the second other system allows a decoder within the second other system to retrieve the same codevector from an identical codebook. This is a reconstructed approximation of the corresponding input vector. Compression is thus obtained by transmitting the index of the codevector rather the codevector itself.

In an article entitled "Lossy Compression of Hyperspectral Data Using Vector Quantization" by Michael Ryan and John Arnold in the journal Remote Sens. Environ., Elsevier Science Inc., New York, N.Y., 1997, Vol. 61, pp. 419-436, an overview of known general vector quantization techniques is presented. The article is herein incorporated by reference. In particular, the authors describe issues such as distortion measures and classification issues arising from lossy compression of hyper-spectral data using vector quantization.

However, implementation of a lossy compression method such as the VQ for real-time data compression of a continuous data flow is substantially complicated due to the fact that the complete hyper-spectral data cube is not available for compression. In real-time compression onboard a satellite hyper-spectral data corresponding to only a 2D focal plane frame sensed at a given moment from a swath target—across track line—on ground is available together with the hyper-spectral data corresponding to 2D focal plane frames sensed before. One—spatial-dimension of the 2D focal plane frame corresponds to a line of ground samples—called ground pixels, and another dimension of the 2D focal plane frame corresponds to a spectrum expansion of each ground pixel in wavelength. The spectrum expansion of a ground pixel is referred to as a "spectral vector". A focal plane frame comprises a same number of spectral vectors and ground pixels. The second spatial dimension of the hyper-spectral data cube is obtained by sensing successive swath targets in along-track direction of the moving satellite producing successive 2D focal plane frames.

Therefore, it is only possible to apply the compression to successive 2D plane frames or successive regions comprising several 2D plane frames substantially inhibiting successful application of lossy compression such as VQ at high compression ratios. Application of conventional lossy compression methods on a region-by-region basis results in visible artifacts at the boundaries between the regions severely affecting image quality after decompression.

Furthermore, for real-time compression of a continuous hyper-spectral data flow, it is necessary to increase data throughput by using parallel operation of a plurality of compression engines. Therefore, a regional data cube is split into a plurality of smaller regional sub-cubes, referred to as vignettes herein. However, when a regional data cube is split into vignettes and each vignette is processed independently a spatial boundary is introduced between two adjacent vignettes resulting in visible artifacts after decompression.

Yet another problem in real-time data compression is data loss due to single bit errors. The data loss due to single bit errors is a critical issue in the development of space borne hyper-spectral imagers, especially when an onboard data compressor is used. Data are more sensitive to single bit errors after compression. If, for example, a single bit error occurs during transmission of an index map and/or codebook, the reconstructed data for the regional data cube are subject to error. If the index map and/or codebook are lost, then the complete regional data cube is lost.

SUMMARY OF THE INVENTION

It is, therefore, an object of the present invention to provide a method and system for compression of a continuous data flow having a high compression ratio and substantially reduced image artifacts.

It is further an object of the present invention to provide a method and system for compression of a continuous data flow having a high data throughput using parallel operating compression engines.

It is yet another object of the present invention to provide a method and system for data compression of a continuous data flow providing full redundancy for data reconstruction in case of single bit errors.

The various embodiments of the method and system for compressing a continuous data flow according to the invention are highly advantageous for numerous applications where it is necessary to process large data sets such as hyper-spectral data cubes in real-time. In a first embodiment of parallel processing using a plurality of compression engines is facilitated by separating a data cube into a plurality of clusters comprising similar spectral vectors such that no artificial spatial boundaries are introduced between separated portions thereby substantially improving image quality. Furthermore, the spectral vectors within a cluster are more easily compressed due to their similarity. In the second embodiment a predetermined number of 2D focal plane frames in a boundary area of a previous regional data cube close to a current regional data cube are included in a training set used for codevector training for the current region. Therefore, no artificial boundary occurs between the two adjacent regions when codevectors trained in this way are used for codebook generation and encoding of the spectral vectors of the current regional data cube. This process substantially reduces image artifacts between adjacent regions. A remedy for the single bit error problem is provided in the third embodiment set out below. Full redundancy of compressed data for a regional data cube is obtained by combining a previous regional data cube and the current regional data cube for codebook training. In order to obtain redundancy for the index map, the codebook is used to encode the current regional data cube as well as the previous regional data cube producing a baseline index map for the current regional data cube and a redundant index map for the previous regional data cube. Therefore, full redundancy for a regional data cube is provided allowing restoration of a regional data cube even if its codebook and/or index map are corrupted or lost due to single bit errors.

In accordance with a first aspect of the present invention there is provided, a method for compressing multi-dimensional data comprising the steps of:
a) receiving the multidimensional data, the multi-dimensional data comprising a plurality of data vectors indicative of an image of an object;
b) partitioning the plurality of data vectors into at least two clusters based on similarity of the data vectors such that each of the at least two clusters contains similar data vectors;
c) providing each of the at least two clusters to at least a compression engine for processing;
d) determining a plurality of codevectors through training for approximating each of the data vectors of a cluster of the at least two clusters with a fidelity above a predetermined threshold based on the data vectors contained in the cluster;
e) encoding each of the data vectors of a cluster using a codevector of the plurality of trained codevectors;
f) storing the plurality of trained codevectors in a codebook of a cluster; and,
g) storing in an index map of a cluster an index for each of the data vectors in the cluster indicative of a codevector's location within the codebook of the cluster.

In accordance with a second aspect of the present invention there is provided, a method for compressing a continuous data flow comprising the steps of:
a) receiving a $m^{th}$ regional data set of the continuous data flow, the $m^{th}$ regional data set comprising a plurality of data vectors indicative of a $m^{th}$ region of an image of an object;
b) generating a $m^{th}$ regional training set for codevector training comprising the plurality of data vectors of the $m^{th}$ regional data set and data vectors of at least a data subset adjacent to the $m^{th}$ regional data set of the $m^{th}$ regional data set;
  b1) partitioning the plurality of data vectors of the $m^{th}$ regional training set into at least two clusters based on similarity of the data vectors such that each of the at least two clusters contains similar data vectors;
  b2) providing each of the at least two clusters to at least a compression engine for processing;
c) determining a plurality of codevectors through training for approximating each of the data vectors of a cluster of the at least two clusters of the $m^{th}$ regional training set with a fidelity above a predetermined threshold based on the data vectors contained in the cluster of the $m^{th}$ regional training set;
d) encoding each of the data vectors of the cluster of the $m^{th}$ regional data set using a codevector of the plurality of trained codevectors;
e) storing the plurality of trained codevectors in a codebook of a cluster of the at least two clusters of a $m^{th}$ regional data set;
f) storing in an index map of a cluster of the at least two clusters of a $m^{th}$ regional data set an index for each of the data vectors in the cluster indicative of a codevector's location within the codebook of the cluster of the $m^{th}$ regional data set;
g) providing the index map of the cluster of the $m^{th}$ regional data set and the codebook of the cluster of the $m^{th}$ regional data set for transmission; and, repeating steps a) to g) for subsequent regions.

In accordance with a third aspect of the present invention there is provided, a method for compressing a continuous data flow comprising the steps of:
a) receiving a $m^{th}$ regional data set of the continuous data flow, the $m^{th}$ regional data set comprising a plurality of data vectors indicative of a $m^{th}$ region of an image of an object;
b) generating a $m^{th}$ regional training set for codevector training comprising the plurality of data vectors of the $m^{th}$ regional data set and the plurality of data vectors of the $m^{th}$ regional data set;
  b1) partitioning the plurality of data vectors of the $m^{th}$ regional training set into at least two clusters based on similarity of the data vectors such that each of the at least two clusters contains similar data vectors;
  b2) providing each of the at least two clusters to at least a compression engine for processing;
c) determining a plurality of codevectors through training for approximating each of the data vectors of a cluster of the at least two clusters of the $m^{th}$ regional data set and the $m^{th}$ regional data set with fidelity above a predetermined threshold based on the data vectors contained in the cluster of the $m^{th}$ regional training set;
d) encoding each of the data vectors of the cluster of the $m^{th}$ regional data set and the $m-1^{th}$ regional data set using a codevector of the plurality of trained codevectors;
e) storing the plurality of trained codevectors in a codebook of a cluster of the at least two clusters of a $m^{th}$ regional data set;
f) storing in a baseline index map of a cluster of the at least two clusters of a $m^{th}$ regional data set an index for each of data vectors in the cluster of $m^{th}$ regional data set indicative of a codevector's location within the codebook of the cluster of the $m^{th}$ regional data set, the index corresponding to a data vector of the cluster of the $m^{th}$ regional data set;
g) storing in a redundant index map of a cluster of the at least two clusters of the $m-1^{th}$ regional data set an index for each of data vectors in the cluster of the $m^{th}$ regional data set indicative of a codevector's location within the codebook of the cluster of the $m^{th}$ regional data set, the index corresponding to a data vector of the cluster of the $m-1^{th}$ regional data set;
h) providing the codebook of the cluster of the $m^{th}$ regional data set, the baseline index map of the cluster of the $m^{th}$ regional data set and the redundant index map of the cluster of the $m-1^{th}$ regional data set for transmission; and, repeating steps a) to h) for subsequent regions.

In accordance with the present invention there is further provided, a storage medium having stored thereon at least an executable command for when executed resulting in performance of the steps of:

a) receiving the multidimensional data, the multi-dimensional data comprising a plurality of data vectors indicative of an image of an object;

b) partitioning the plurality of data vectors into at least two clusters based on similarity of the data vectors such that each of the at least two clusters contains similar data vectors;

c) providing each of the at least two clusters to at least a compression engine for processing;

d) determining a plurality of codevectors through training for approximating each of the data vectors of a cluster of the at least two clusters with a fidelity above a predetermined threshold based on the data vectors contained in the cluster;

e) encoding each of the data vectors of a cluster using a codevector of the plurality of trained codevectors;

f) storing the plurality of trained codevectors in a codebook; and, g) storing in an index map an index indicative of a codevector's location within the codebook.

In accordance with the present invention there is further provided, a system for compressing multi-dimensional data comprising:

a first port for receiving the multi-dimensional data;

electronic circuitry in data communication with the first port, the electronic circuitry for performing the steps of:

a) receiving the multidimensional data, the multi-dimensional data comprising a plurality of data vectors indicative of an image of an object;

b) partitioning the plurality of data vectors into at least two clusters based on similarity of the data vectors such that each of the at least two clusters contains similar data vectors;

c) providing each of the at least two clusters to at least a compression engine for processing;

d) determining a plurality of codevectors through training for approximating each of the data vectors of a cluster of the at least two clusters with a fidelity above a predetermined threshold based on the data vectors contained in the cluster;

e) encoding each of the data vectors of a cluster using a codevector of the plurality of trained codevectors;

f) storing the plurality of trained codevectors in a codebook; and, g) storing in an index map of a cluster an index for each of the data vectors in the cluster indicative of a codevector's location within the codebook of the cluster; and, a second port in data communication with the electronic circuitry for providing the codebook and the index map of each cluster of a regional data set.

In accordance with the present invention there is yet further provided, a storage medium having stored thereon at least an executable command for when executed resulting in performance of the steps of:

a) receiving a $m^{th}$ regional data set of the continuous data flow, the $m^{th}$ regional data set comprising a plurality of data vectors indicative of a $m^{th}$ region of an image of an object;

b) generating a $m^{th}$ regional training set for codevector training comprising the plurality of data vectors of the $m^{th}$ regional data set and the plurality of data vectors of the m–$1^{th}$ regional data set;

b1) partitioning the plurality of data vectors of the $m^{th}$ regional training set into at least two clusters based on similarity of the data vectors such that each of the at least two clusters contains similar data vectors;

b2) providing each of the at least two clusters to at least a compression engine for processing;

c) determining a plurality of codevectors through training for approximating each of the data vectors of a cluster of the at least two clusters of the $m^{th}$ regional data set and the m–$1^{th}$ regional data set with a fidelity above a predetermined threshold based on the data vectors contained in the cluster of the $m^{th}$ regional training set;

d) encoding each of the data vectors of the cluster of the $m^{th}$ regional data set and the m–$1^{th}$ regional data set using a codevector of the plurality of trained codevectors;

e) storing the plurality of trained codevectors in a codebook of a cluster of the at least two clusters of the $m^{th}$ regional data set;

f) storing in a baseline index map of a cluster of the at least two clusters of a $m^{th}$ regional data set an index for each of data vectors in the cluster of $m^{th}$ regional data set indicative of a codevector's location within the codebook of the cluster of the $m^{th}$ regional data set, the index corresponding to a data vector of the cluster of the $m^{th}$ regional data set;

g) storing in a redundant index map of a cluster of the at least two clusters of m–$1^{th}$ regional data set an index for each of data vectors of m–$1^{th}$ regional data set in the cluster indicative of a codevector's location within the codebook of the cluster of the $m^{th}$ regional data set, the index corresponding to a data vector of the cluster of the m–$1^{th}$ regional data set;

h) providing the codebook of the cluster of the $m^{th}$ regional data set, the baseline index map of the cluster of the $m^{th}$ regional data set and the redundant index map of the cluster of the m–$1^{th}$ regional data set for transmission; and, repeating steps a) to h) for subsequent regions.

In accordance with the present invention there is yet further provided, a system for compressing multi-dimensional data comprising:

a first port for receiving the multi-dimensional data;

electronic circuitry in data communication with the first port, the electronic circuitry for performing the steps of:

a) receiving a $m^{th}$ regional data set of the continuous data flow, the $m^{th}$ regional data set comprising a plurality of data vectors indicative of a $m^{th}$ region of an image of an object;

b) generating a $m^{th}$ regional training set for codevector training comprising the plurality of data vectors of the $m^{th}$ regional data set and the plurality of data vectors of the m–$1^{th}$ regional data set;

b1) partitioning the plurality of data vectors of the $m^{th}$ regional training set into at least two clusters based on similarity of the data vectors such that each of the at least two clusters contains similar data vectors;

b2) providing each of the at least two clusters to at least a compression engine for processing;

c) determining a plurality of codevectors through training for approximating each of the data vectors of a cluster of the at least two clusters of the $m^{th}$ regional data set and the m–$1^{th}$ regional data set with a fidelity above a predetermined threshold based on the data vectors contained in the cluster of the $m^{th}$ regional training set;

d) encoding each of the data vectors of the cluster of the $m^{th}$ regional data set and the $m-1^{th}$ regional data set using a codevector of the plurality of trained codevectors;

e) storing the plurality of trained codevectors in a codebook of a cluster of the at least two clusters of the $m^{th}$ regional data set;

f) storing in a baseline index map of a cluster of the at least two clusters of a $m^{th}$ regional data set an index for each of data vectors in the cluster of $m^{th}$ regional data set indicative of a codevector's location within the codebook of the cluster of the $m^{th}$ regional data set, the index corresponding to a data vector of the cluster of the $m^{th}$ regional data set;

g) storing in a redundant index map of a cluster of the at least two clusters of $m-1^{th}$ regional data set an index for each of data vectors in the cluster of $m-1^{th}$ regional data set indicative of a codevector's location within the codebook of the cluster of the $m^{th}$ regional data set, the index corresponding to a data vector of the cluster of the $m-1^{th}$ regional data set;

h) providing the codebook of the cluster of the $m^{th}$ regional data set, the baseline index map of the cluster of the $m^{th}$ regional data set and the redundant index map of the cluster of the $m-1^{th}$ regional data set for transmission; and, repeating steps a) to h) for subsequent regions; and, a second port in data communication with the electronic circuitry for providing the codebook of the cluster of the m.sup.th regional data set, the baseline index map of the cluster of the m.sup.th regional data set and the redundant index map of the cluster of the m−1.sup.th regional data set.

In another aspect, the present invention provides a method for compressing multi-dimensional data of a continuous data flow and for use with data processing and data transmission systems, the method comprising:

a) receiving the multi-dimensional data at a first port of said data processing system, said multi-dimensional data comprising a regional data set of said continuous data flow, said regional data set comprising a plurality of data vectors indicative of a corresponding region of an image of an object;

b) using electronic circuitry to generate a regional training set for codevector training, said regional training set comprising the plurality of data vectors of said regional data set and data vectors of a data subset adjacent to said regional data set in said continuous data flow;

c) using electronic circuitry to determine a plurality of codevectors through training for approximating each of the data vectors of the regional data set with a fidelity above a predetermined threshold, said plurality of codevectors being based on the data vectors contained in the regional training set to result in a plurality of trained codevectors;

d) using electronic circuitry to encode each of the data vectors of the regional data set using a codevector from said plurality of trained codevectors;

e) storing the plurality of trained codevectors in a regional codebook;

f) for each data vector of regional data set, storing in a regional index map an index indicative of a trained codevector's location within said regional codebook;

g) repeating steps a)-f) for each subsequent regional data set of said continuous data flow, wherein said data vectors are spectral data having multi-spectral data and wherein using said regional training set comprising the plurality of data vectors from said regional data set and data vectors of an adjacent data subject reduces artificial visual boundaries in a decompressed version of said image.

In yet another aspect, the present invention provides a method for compressing multi-dimensional data of a continuous data flow and for use with data processing and data transmission systems, the method comprising:

a) receiving the multi-dimensional data at a first port of said data processing system, said multi-dimensional data comprising a first regional data set of said continuous data flow, said regional data set comprising a plurality of data vectors indicative of a corresponding region of an image of an object;

b) using electronic circuitry to generate a regional training set for codevector training, said regional training set comprising the plurality of data vectors of said first regional data set and a plurality of data vectors of a second regional data set, said second regional data set being a regional data set immediately preceding said first regional data set in said continuous data flow, said second regional data set being previously received prior to a reception of said first regional data set;

c) using electronic circuitry to determine a plurality of codevectors through training for approximating each of the data vectors of the first regional data set and of the second regional data set with a fidelity above a predetermined threshold, said plurality of codevectors being based on the data vectors contained in the first regional training set to result in a plurality of trained codevectors;

d) using electronic circuitry to encode each of the data vectors of the first regional data set and the second regional data set using a codevector from said plurality of trained codevectors;

e) storing the plurality of trained codevectors in a regional codebook;

f) for each data vector of said first regional data set, storing in a regional baseline index map an index indicative of a trained codevector's location within said first regional codebook;

g) for each data vector of said second regional data set, storing in a regional redundant index map an index indicative of a trained codevector's location within said regional codebook h) repeating steps a)-g) for each subsequent regional data set of said continuous data flow;

wherein said data vectors are spectral data having multi-spectral data and wherein using said regional baseline index map and said regional redundant index map provides for protection from data loss due to single bit errors.

BRIEF DESCRIPTION OF THE DRAWINGS

Exemplary embodiments of the invention will now be described in conjunction with the drawings in which.

DETAILED DESCRIPTION OF THE INVENTION

Unlike in applications where a complete data cube is available for compression, in real-time compression onboard a satellite, hyper-spectral data corresponding to only a 2D focal plane frame sensed at a given moment from a swath target on ground is available together with the hyper-spectral data corresponding to 2D focal plane frames sensed before. One—spatial-dimension of the 2D focal plane frame corresponds to a line of ground pixels, and another dimension of the 2D focal plane frame corresponds to a spectral vector of each ground pixel. The second spatial dimension of the hyper-spectral data cube is obtained by sensing successive swath targets in along-track direction of the moving satellite producing successive 2D focal plane frames. A series of 2D focal plane frames collected in a given—short—period of time covers an instantaneous scene on the ground—referred to as a region—and is treated as a regional data cube for the purpose of dividing the continuous flow of 2D focal plane frames into complete data cubes of manageable size for compression. Data compression of a continuous data flow using a lossy compression method such as VQ is, therefore, performed by dividing the continuous data flow into regional data cubes. However, there will be a visible spatial boundary between two adjacent regions within an image after decompression, since the compression of each region is independent.

Figure 1:
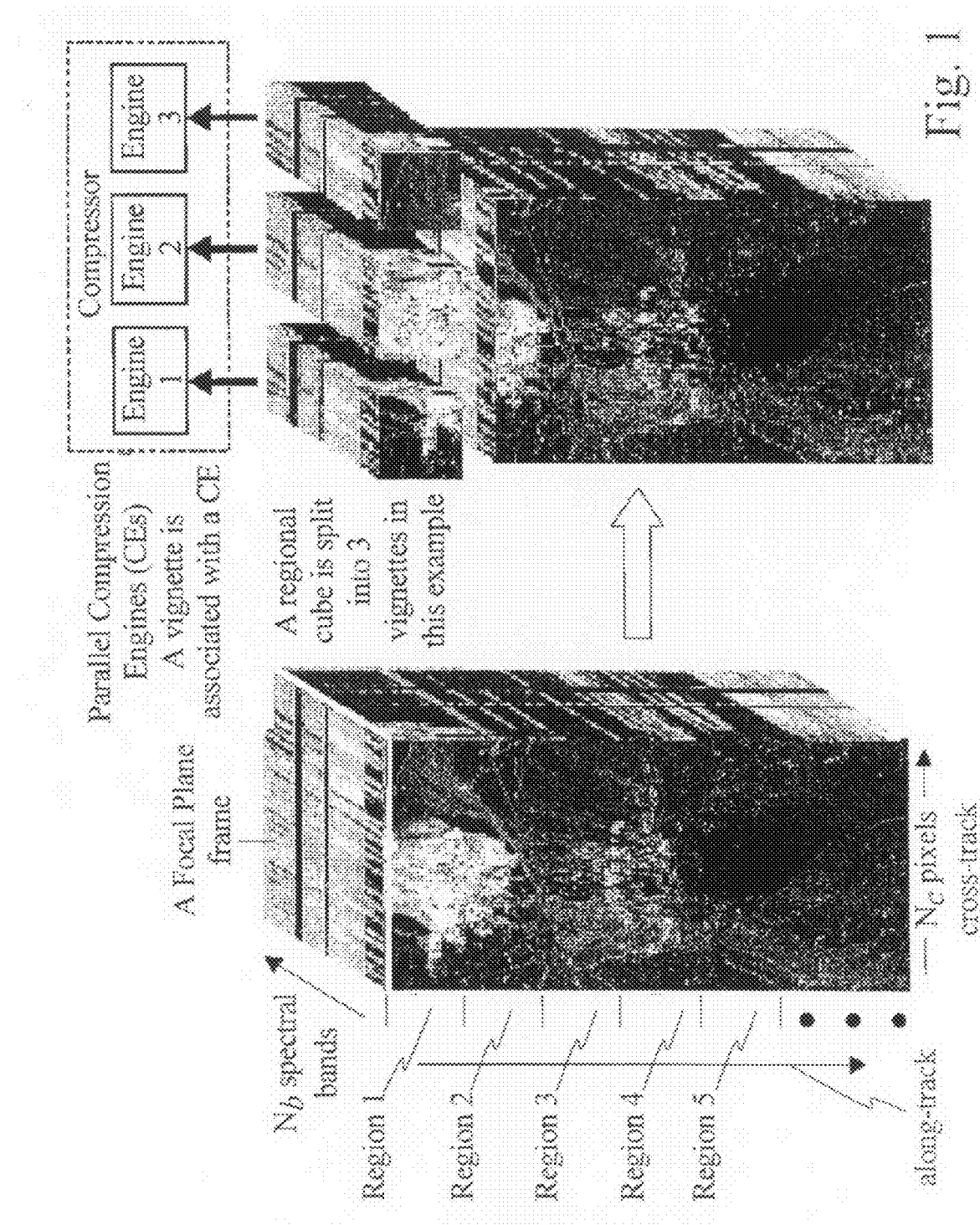
FIG. 1 is a simplified diagram schematically illustrating splitting of a regional data cube into vignettes.

For compression of a continuous hyper-spectral data flow, it is advantageous to increase data throughput by using in parallel a plurality of compression engines. Therefore, a regional data cube is split into a plurality of smaller regional sub-cubes, referred to as vignettes herein. Each vignette is a rectangular sub-set of a regional scene containing all the spectral bands. For example, FIG. 1 shows an example of dividing a regional data cube into 3 vignettes, with each vignette being independently processed by one of 3 compression engines (CEs).

Using an arrangement of multiple CEs for parallel processing of a plurality of vignettes, processing speed is substantially increased. For example, for a hyper-spectral sensor acquiring 1024 pixels in a line in across-track direction, a regional data cube with a length of 64 lines in along-track direction is divided into 16 vignettes with each vignette having a size of 64 pixels by 64 pixels. Using 16 compression engines to compress the 16 vignettes in parallel a throughput of 1000 Mbps is achieved.

Figure 2:
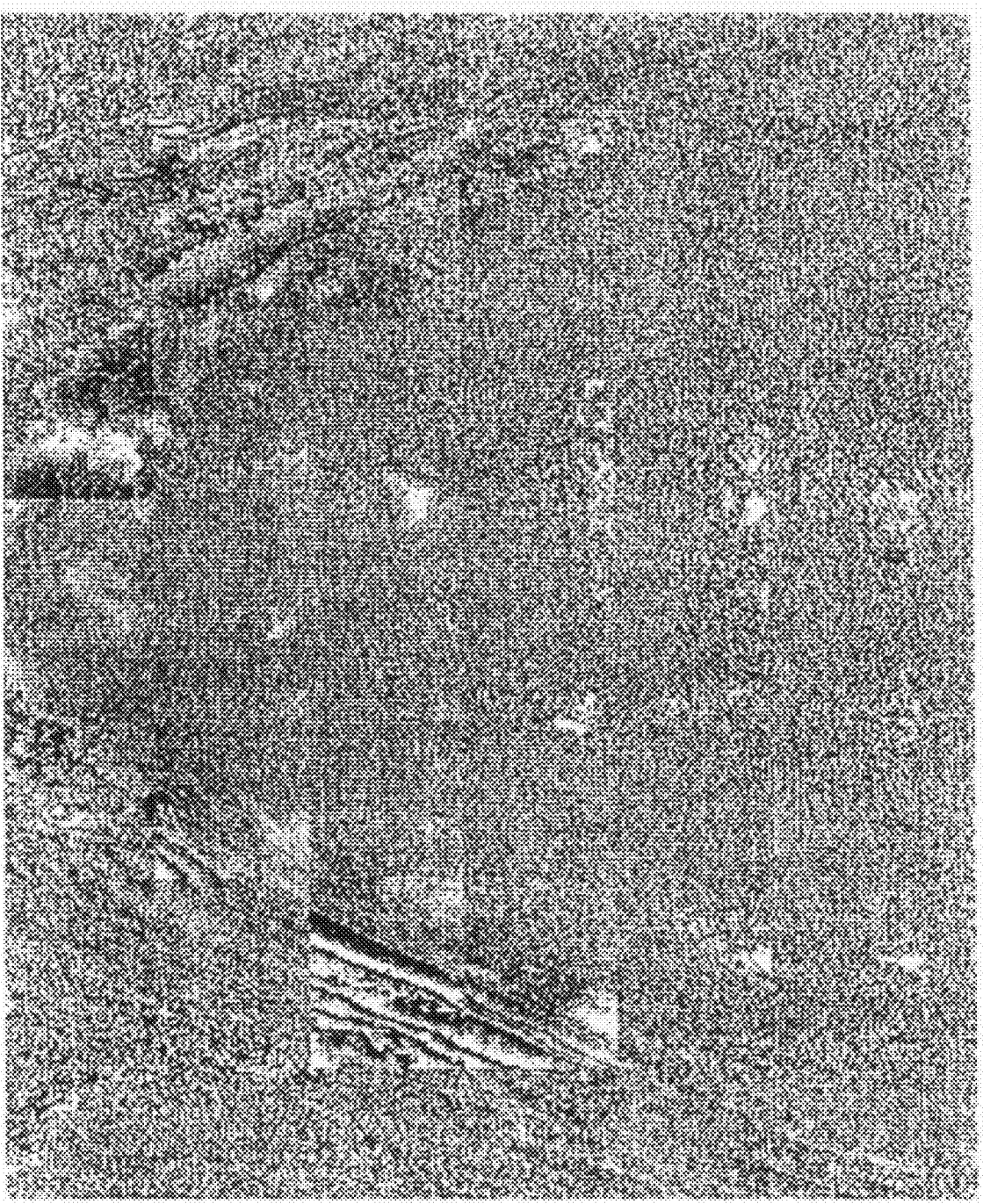
FIG. 2 is an error image illustrating image artifacts due to artificial boundaries within a regional data cube after image reconstruction.

However, when a regional data cube is split into vignettes and each vignette is processed independently, a spatial boundary is introduced between two adjacent vignettes in the region in both across-track and along-track directions resulting in visible artifacts after decompression. FIG. 2 shows a one-band error image obtained from an error cube between the original and reconstructed data cube after decompression. Spatial boundaries occur in both across-track and along-track directions resulting in intolerable visible artifacts.

In the following, various embodiments for compression of a continuous data flow are disclosed in connection with an example of compressing a continuous flow of hyper-spectral data onboard a satellite. From the description below, it will be apparent to those of skill in the art that the method for compressing a continuous data flow is not only applicable to satellite applications but in numerous other applications such as MRI imaging systems or CT scanners.

Lossy data compression based on the VQ process maps a large set of input vectors such as spectral vectors of a hyper-spectral data cube into a small set of indexed codevectors forming a codebook. Thus, the spectral vectors of the hyper-spectral data cube are replaced by a codebook comprising indexed codevectors and an index map allocating to each pixel a codevector based on its index, which are then transmitted. Using the codebook and the index map, it is possible to reconstruct a hyper-spectral data cube resembling the data cube before compression. Fidelity of the compression strongly depends on the codevectors forming the codebook. Therefore, codebook generation and, in particular, codevector training is a crucial step of the data compression process.

The steps of codebook generation and vector encoding of the various embodiments of the method for compressing a continuous data flow have been implemented using the Successive Approximation Multi-stage Vector Quantization (SAMVQ) technique disclosed by the inventors in U.S. patent application Ser. No. 09/717,220. In the following it will become apparent to those of skill in the art that the SAMVQ technique is easily updated and improved by one of numerous other lossy data compression techniques. Alternatively, another lossy data compression technique is employed.

In accordance with a first embodiment of the invention, instead of dividing a regional data cube into rectangular vignettes a regional data cube is separated into clusters comprising similar spectral vectors. As a result, the similar spectral vectors within a cluster are not located within one specific area of the regional data cube but are associated with particular scenes such as a certain type of vegetation or a water surface. By separating the regional data cube into clusters of similar spectral vectors, no artificial spatial boundaries are introduced, thereby substantially improving image quality. Furthermore, the spectral vectors within a cluster are more easily compressed due to their similarity. Fewer codevectors and fewer approximation stages are used to achieve same or better fidelity compared to the vignette approach resulting in a higher compression ratio.

For example, a regional data cube is separated into a plurality of clusters in a pre-processing step, applying a classification method prior to distribution of the clusters to a plurality of CEs for compression in parallel. The classification method used in the present invention is referred to herein as a spectral vector partition process. It classifies a spectral vector in a regional data cube into a partition based on a distance of the spectral vector to the centroid of the partition. This classification method is simple, fast and easily implemented in hardware. Of course, numerous other classification methods are applicable as well.

In order to fully use the capacity of each of the plurality of compression engines, it is favorable to have clusters of approximately equal size. Therefore, the classification process implemented in the present method adaptively controls the size of each cluster by splitting and merging clusters during the course of the classification process.

Figure 3:
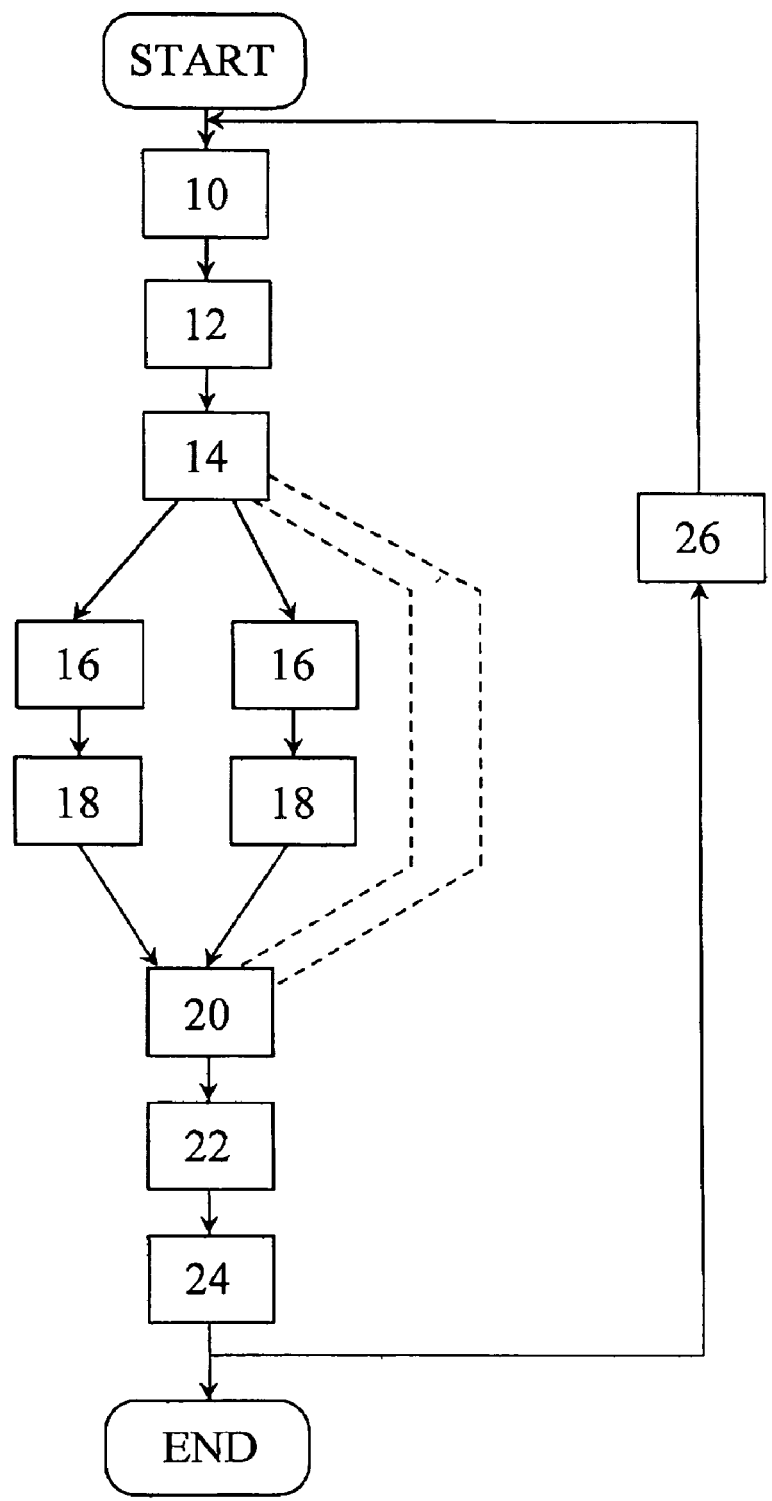
FIG. 3 is a simplified flow diagram of a first embodiment of a method for compressing a continuous data flow in real-time according to the present invention.

Referring to FIG. 3, a simplified flow diagram of the first embodiment of a method for compressing a continuous data flow is shown. Multi-dimensional data in the form of a regional data cube are received from, for example, a hyper-spectral sensor at 10. The multi-dimensional data comprise a plurality of data vectors indicative of a region of an image of an object. The plurality of data vectors is then partitioned into at least two clusters based on similarity of the data vectors such that each of the at least two clusters contains similar data vectors within known limits at 12. For example, a classification method is used that partitions the data vectors based on the distance of a data vector to the centroid of each of the at least two clusters. During the partitioning process, the size of the at least two clusters is adaptively controlled by splitting and merging the clusters. Using, for example, the above described classification method, results in partitioning of the data vectors in a geometrically irregular fashion. After partitioning, each of the at least two clusters is provided to at least a compression engine for parallel processing of the at least two clusters at 14. Each cluster is processed on a respective compression engine for determining a plurality of codevectors through training for approximating each of the data vectors of a cluster of the at least two clusters with a fidelity above a predetermined threshold based on the data vectors contained in the cluster at 16 and encoding each of the data vectors of a cluster using a codevector of the plurality of trained codevectors at 18. The plurality of trained codevectors of each cluster are stored in a codebook at 20 and an index for each of data vectors in the cluster indicative of a codevector's location within the codebook is stored in an index map at 22. Finally, the codebook and the index map of each cluster are provided for transmission at 24. The process indicated at 10 to 24 is repeated for subsequent regional data cubes of the continuous data flow at 26.

Figure 4:
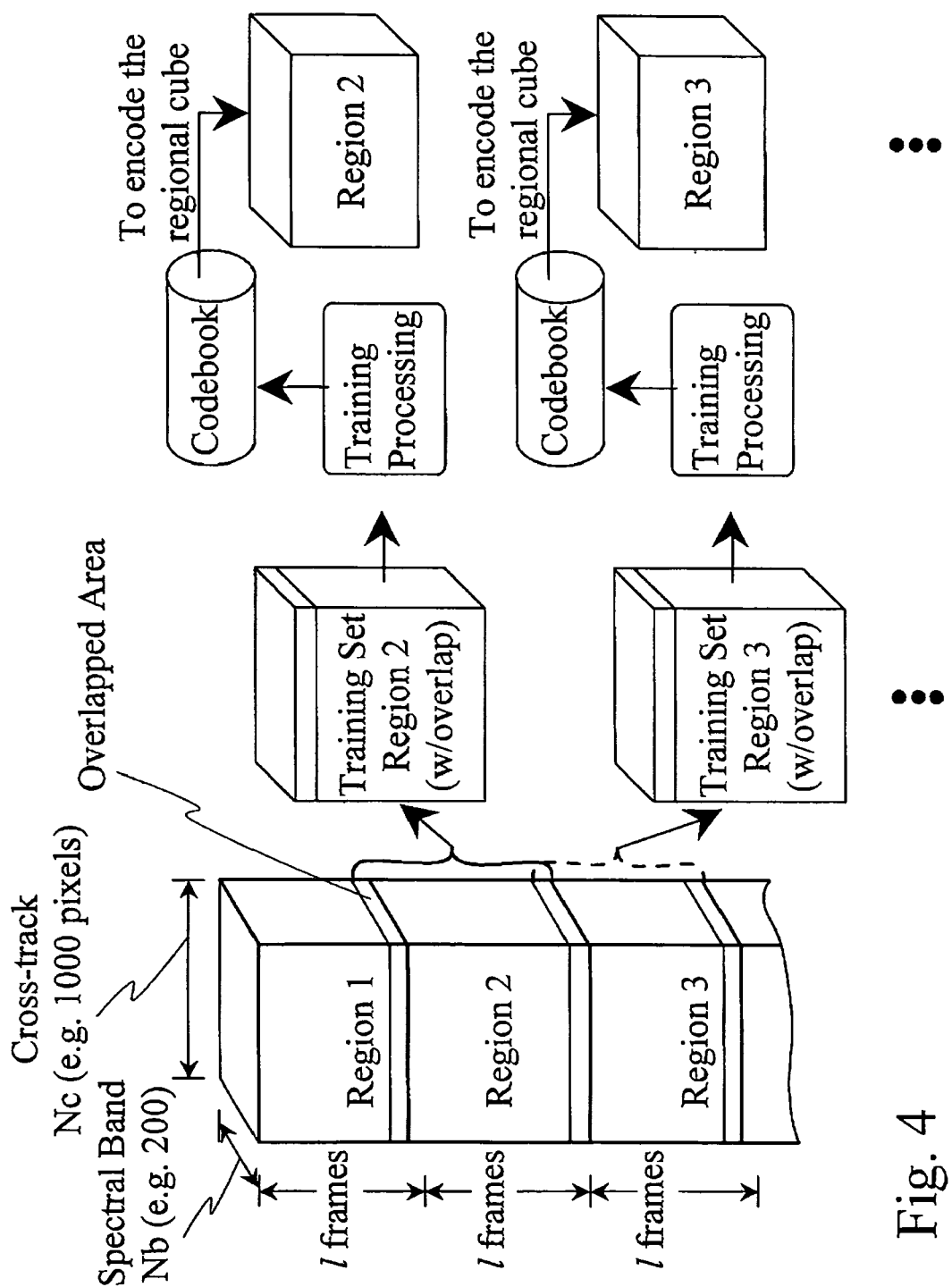
FIG. 4 is a simplified diagram schematically illustrating a data compression process according to a second embodiment of the present invention.

In real-time data compression, a series of 2D focal plane frames acquired in a given period of time are treated as a regional data cube for the purpose of dividing a continuous series of 2D focal plane frames into a plurality of data cubes. There will be a visible spatial boundary between two adjacent regions after the data are decompressed, since the compression of each region is independent. This problem is overcome in accordance with a second embodiment. A predetermined number of 2D focal plane frames in a boundary area of a previous regional data cube close to a current regional data cube are included in a training set used for codevector training for the current region, as shown in FIG. 4. Because of the similarity between the spectral vectors of the current regional data cube and those from the overlapped boundary area of the previous regional data cube, the codevectors trained for the current regional data cube—especially the codevectors in a boundary area close to the previous regional data cube—are highly correlated with the codevectors trained in the previous regional data cube. Therefore, a reduced or no artificial boundary occurs between the two adjacent regions when codevectors trained in this way are used for codebook generation and encoding of the spectral vectors of the current regional data cube.

Figure 5:
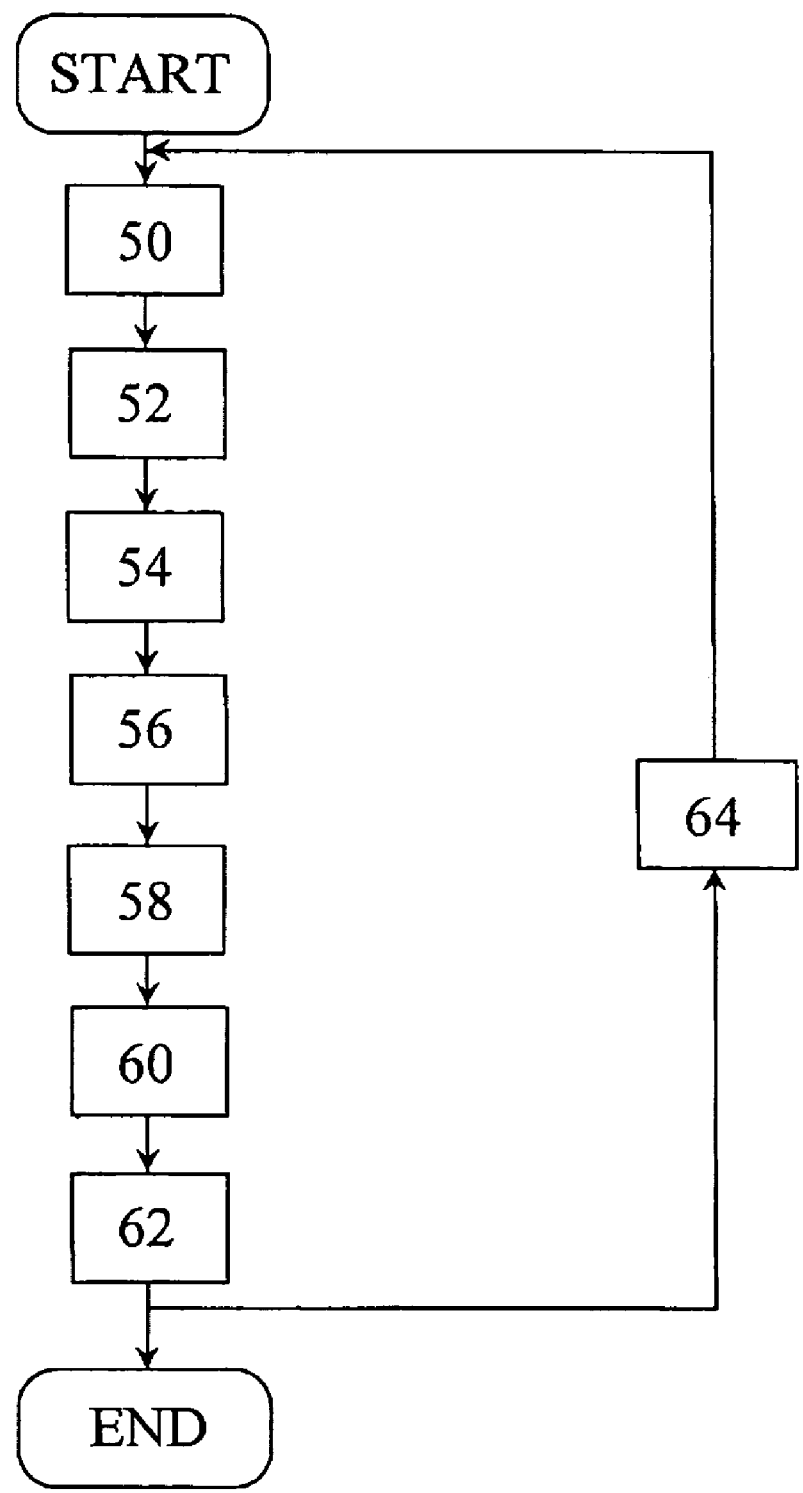
FIG. 5 is a simplified flow diagram of a second embodiment of a method for compressing a continuous data flow in real-time according to the present invention.

Referring to FIG. 5, a simplified flow diagram of the second embodiment is shown. A $m^{th}$ regional data set of the continuous data flow is received at 50. The $m^{th}$ regional data set comprises a plurality of data vectors indicative of a $m^{th}$ region of an image of an object. In a following step a $m^{th}$ regional training set for codevector training is generated at 52. The $m^{th}$ regional training set comprises the plurality of data vectors of the $m^{th}$ regional data set and data vectors of a data subset adjacent to the $m^{th}$ regional data set of the $m-1^{th}$ regional data set. For example, the data subset comprises spectral vectors of one or more 2D focal plane frames. A plurality of codevectors is determined through training for approximating each of the data vectors of the $m^{th}$ regional data set with fidelity above a predetermined threshold based on the data vectors contained in the $m^{th}$ regional training set at 54. Each of the data vectors of the $m^{th}$ regional data set are then encoded using a codevector of the plurality of trained codevectors at 56. The plurality of trained codevectors is stored in a $m^{th}$ regional codebook at 58 and an index indicative of a codevector's location within the $m^{th}$ regional codebook is stored in a $m^{th}$ regional index map at 60. In the regional index map, each entry corresponds to a codevector that approximates one of the data vectors of the regional data set. The $m^{th}$ regional index map and the $m^{th}$ regional codebook are then provided for transmission at 62. The process indicated at 50 to 62 is repeated for subsequent regional data cubes of the continuous data flow at 64.

Data loss due to single bit errors is a critical issue in the development of space borne hyper-spectral imagers, especially when an onboard data compressor is used. Data are more sensitive to single-bit errors after compression. Compressed data of a regional data cube are encapsulated into source packages and placed in multiple transfer frames before transmission to ground. Single bit errors are likely to cause corruption or loss of transfer frames. If a single bit error occurs in a transfer frame that contains the index map and/or codebook, the reconstructed data for the regional data cube are subject to error. If the transfer frame containing the index map and/or codebook is lost, then the complete regional data cube is lost.

Figure 6:
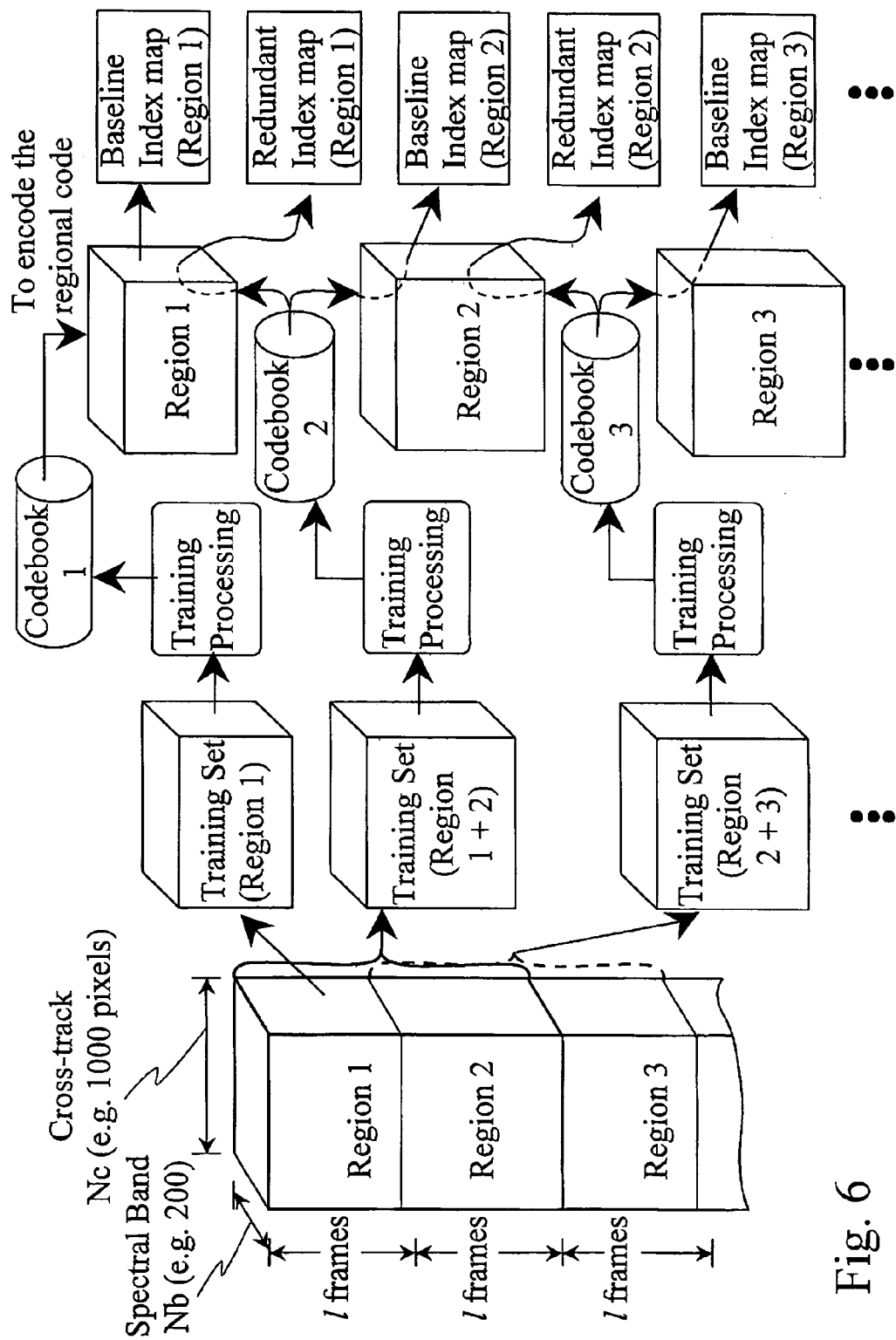
FIG. 6 is a simplified diagram schematically illustrating a data compression process according to a third embodiment of the present invention.

A remedy for the single bit error problem is provided in accordance with a third embodiment of the invention. Full redundancy of compressed data for a regional data cube is obtained by combining the previous regional data cube and the current regional data cube for codebook training. The codebook trained from the combined regional data cubes enable encoding of both regions. As shown in FIG. 6, a codebook is generated based on regional data cubes 1+2, 2+3, etc. A regional data cube is associated with two codebooks. Regional data cube 1 is associated with codebooks 1 and 2, regional data cube 2 is associated with codebooks 2 and 3, etc. Therefore, each regional data cube has a fully redundant codebook. This redundancy does not reduce the compression ratio since the number of codebooks remains the same. In order to obtain redundancy for the index map, the codebook is used to encode the current regional data cube as well as the previous regional data cube producing a baseline index map for the current regional data cube and a redundant index map for the previous regional data cube. For example, the codebook 2—trained from regional data cubes 1+2—is used to generate a baseline index map for region 2 and a redundant index map for region 1. This doubles the data requirements for the index maps; however, the effect on the compression ratio is very small, since an index map is usually a tenth the size of a codebook.

According to the third embodiment, full redundancy is provided for a regional data cube allowing restoration of a regional data cube if its codebook and/or index map are corrupt or lost due to single bit errors. This feature is highly advantageous for protection from a regional data cube loss due to single bit errors occurring onboard a satellite and/or in a downlink channel.

Furthermore, the third embodiment allows application of lossless compression for compressing the codebooks and index maps for further increasing the overall compression ratio. The application of lossless compression is enabled because the data compressed using the third embodiment is fully redundant. Therefore, the reconstruction process is less sensitive to errors including single bit errors introduced after applying lossless compression to the compressed data.

Figure 7:
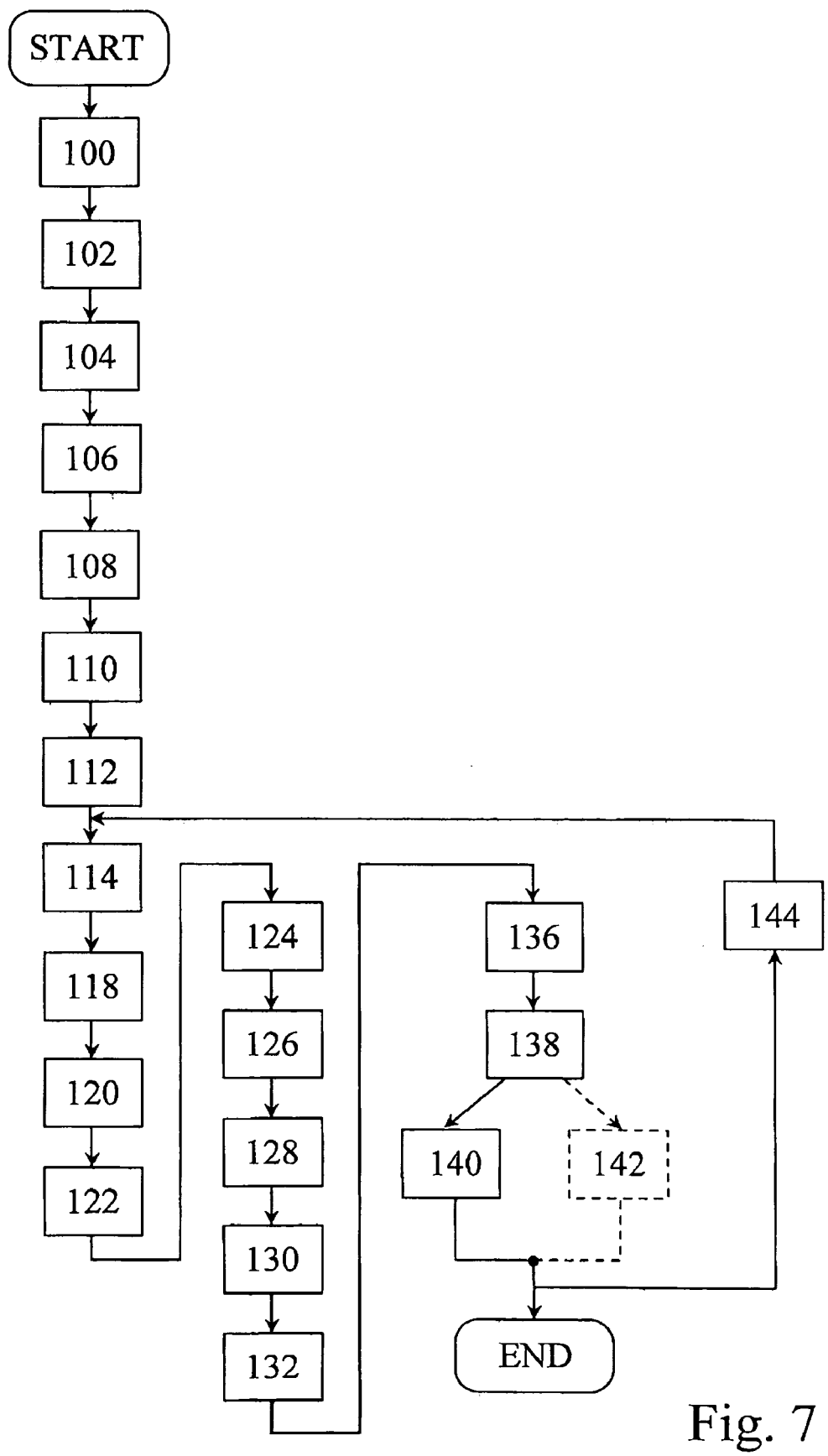
FIG. 7 is a simplified flow diagram of a third embodiment of a method for compressing a continuous data flow in real-time according to the present invention.

Referring to FIG. 7, a simplified flow diagram of the third embodiment is shown. The compression process is started with the following steps. At 100 a first regional data set of the continuous data flow is received. The first regional data set comprises a plurality of data vectors indicative of a first region of the image of an object. A first regional training set for codevector training comprising the plurality of data vectors of the first regional data set is generated at 102. A plurality of codevectors for approximating each of the data vectors of the first regional data set with fidelity above a predetermined threshold is determined through training based on the data vectors contained in the first regional training set at 104. Each of the data vectors of the first regional data set is then encoded using a codevector of the plurality of trained codevectors at 106. The plurality of trained codevectors is stored in a first regional codebook at 108 and an index for each of data vectors in the $1^{st}$ regional data set indicative of a codevector's location within the first regional codebook is stored in a first regional baseline index map at 110. The first regional codebook and the first regional baseline index map are then provided for transmission at 112.

The following regional data sets are then processed as described below. At 114, a $m^{th}$ regional data set of the continuous data flow is received. The $m^{th}$ regional data set comprises a plurality of data vectors indicative of a $m^{th}$ region of the image of an object. A $m^{th}$ regional training set for codevector training is then generated at 118. The $m^{th}$ regional training set comprises the plurality of data vectors of the $m^{th}$ regional data set and the plurality of data vectors of the $m-1^{th}$ regional data set. A plurality of codevectors for approximating each of the data vectors of the $m^{th}$ regional data set and the $m-1^{th}$ regional data set with fidelity above a predetermined threshold is determined through training based on the data vectors contained in the $m^{th}$ regional training set at 120. Each of the data vectors of the $m^{th}$ regional data set and the $m-1^{th}$ regional data set are then encoded based on the respective codevector of the plurality of trained codevectors at 122. The plurality of trained codevectors is stored in a $m^{th}$ regional codebook at 124. An index indicative of a codevector's location within the $m^{th}$ regional codebook is stored in a $m^{th}$ regional baseline index map at 126. The index corresponds to a data vector of each cluster of the $m^{th}$ regional data set. Additionally, an index indicative of a codevector's location within the $m^{th}$ regional codebook is stored in a $m-1^{th}$ regional redundant index map at 128. The index corresponds to a data vector of each cluster of the $m-1^{th}$ regional data set. The $m^{th}$ regional codebook, the $m^{th}$ regional baseline index map and the $m-1^{th}$ regional redundant index map are then provided for transmission at 130. Optionally, the $m^{th}$ regional codebook, the $m^{th}$ regional baseline index map and the $m-1^{th}$ regional redundant index map are further compressed using lossless compression prior to transmission at 132. After transmission at 136 the $m^{th}$ regional codebook, the $m^{th}$ regional baseline index map and the $m-1^{th}$ regional redundant index map via a communication link are received at, for example, a ground station at 138. During normal operation the $m^{th}$ regional data set is reconstructed using the $m^{th}$ regional codebook and the $m^{th}$ regional baseline index map at 140. If, for example, during transmission the $m-1^{th}$ regional codebook and/or the $m-1^{th}$ regional baseline index map is lost, the $m-1^{th}$ regional data set is reconstructed using the $m^{th}$ regional codebook and the $m-1^{th}$ regional redundant index map at 142 upon receipt of the same at 140. The process indicated at 114 to 142 is repeated for subsequent regional data cubes of the continuous data flow at 144.

Table 1 shows a comparison of the compression performance when using the SAMVQ technique in combination with clusters for parallel processing and with data compression using the SAMVQ technique and vignettes. The test data cube is in raw digital number (DN) with 12-bit resolution—data range: 0-4024. The data cube size is 405 pixels in the cross-track direction by 2852 lines by 72 spectral bands—file size 166 Mbytes. The experimental results show that the SAMVQ technique using clusters provides better reconstruction fidelity than the SAMVQ technique using vignettes for a same compression ratio.

TABLE 1

| | SAMVQ (with vignettes) | | | SAMVQ (with clusters) | | |
|---|---|---|---|---|---|---|
| | Compression Ratio | | | | | |
| | 20:1 | 30:1 | 50:1 | 20:1 | 30:1 | 50:1 |
| PSNR(dB) | 55.80 | 51.30 | 47.14 | 57.50 | 54.72 | 51.57 |
| RMSE | 6.51 | 11.00 | 17.68 | 5.38 | 7.34 | 10.62 |

Figure 8A:
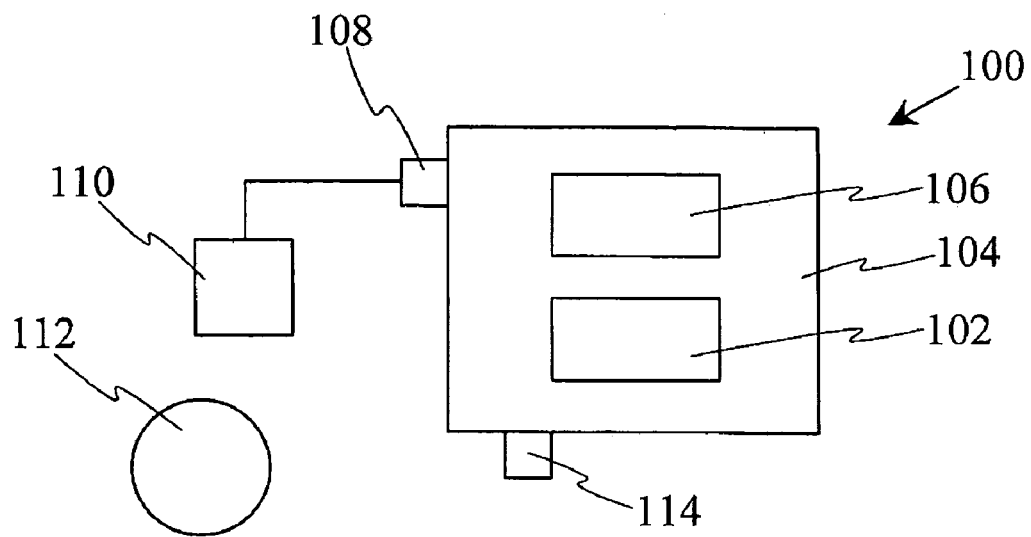
FIG. 8a is a simplified block diagram of a system implementation of the method for compressing a continuous data flow in real-time according to the present invention; and, FIG. 8b is a simplified block diagram of another system implementation of the method for compressing a continuous data flow in real-time according to the present invention.
Figure 8B:
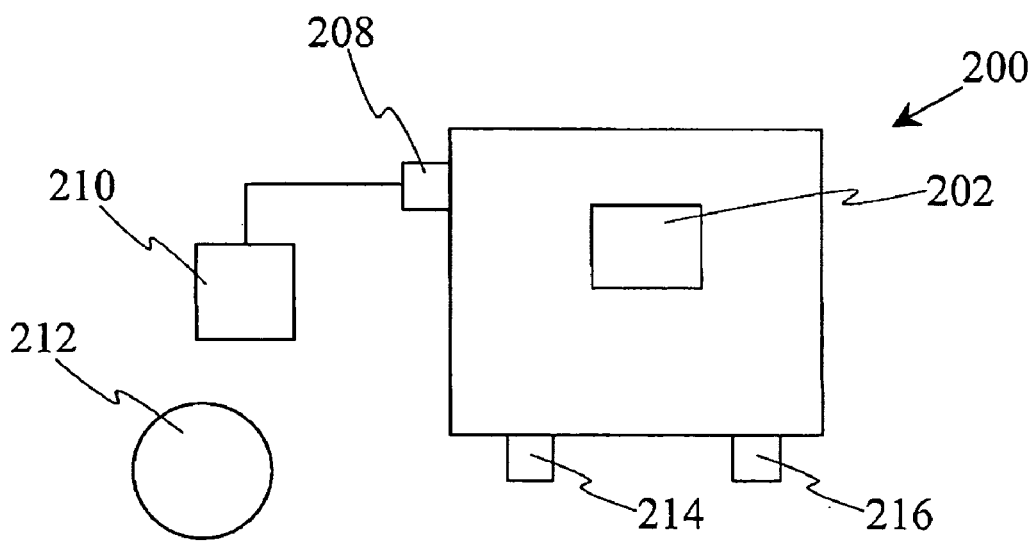

Referring to FIGS. 8a and 8b, system implementations 100 and 200 of the various embodiments are shown. For example, executable commands for execution on at least a processor 102 of a computer 104 are stored in non-volatile memory 106, as shown in FIG. 8a. When executing the stored commands the at least a processor 102 performs the processing steps of one of the above embodiments, preferably, in real-time. The computer is linked via port 108 to an imaging system 110 for data communication therewith. Regional data sets acquired from an object 112 are transmitted via port 108 to the workstation 104 for processing. The compressed data—codebooks and index maps—are provided via port 114 for transmission.

Alternatively, shown in FIG. 8b, the embodiments are realized based on a hardware system implementation 200. Regional data sets acquired from an object 212 are received, preferably in real-time, via port 208 from an imaging system 210. Electronic circuitry 202 performs the processing steps of one of the above embodiments, preferably in real-time. The compressed data—codebooks and index maps—are provided, preferably in real-time, via port 214 for transmission. Control commands, such as commands for initializing a compression process, are received from a data communication medium via port 216.

The various embodiments of the method and system set out above are advantageous for numerous applications where it is necessary to process large data sets such as hyper-spectral data cubes in or near real-time. In the first embodiment, implementation of parallel processing using a plurality of compression engines is facilitated by separating a data cube into a plurality of clusters comprising similar spectral vectors. By separating the data cube into clusters of similar spectral vectors no artificial spatial boundaries are introduced, substantially improving image quality. Furthermore, the spectral vectors within a cluster are more easily compressed due to their similarity. In the second embodiment a predetermined number of 2D focal plane frames in a boundary area of a previous regional data cube close to a current regional data cube are included in a training set used for codevector training for the current region. Therefore, no artificial boundary occurs between the two adjacent regions when codevectors trained in this way are used for codebook generation and encoding of the spectral vectors of the current regional data cube substantially reducing image artifacts between adjacent regions. A remedy for the single bit error problem is provided in the third embodiment. Full redundancy of compressed data for a regional data cube is obtained by combining the previous regional data cube and the current regional data cube for codebook training. In order to obtain redundancy for the index map, the codebook is used to encode the current regional data cube as well as the previous regional data cube producing a baseline index map for the current regional data cube and a redundant index map for the previous regional data cube. Therefore, full redundancy for a regional data cube is provided allowing restoration of a regional data cube if its codebook and/or index map are corrupted or lost due to single bit errors.

Of course, numerous other embodiments of the invention will be apparent to persons skilled in the art without departing from the spirit and scope of the invention as defined in the appended claims.

The invention claimed is:

1. A method for compressing multi-dimensional data of a continuous data flow and for use with data processing and data transmission systems, the method comprising:

a) receiving the multi-dimensional data at a first port of said data processing system, said multi-dimensional data comprising a regional data set of said continuous data flow, said regional data set comprising a plurality of data vectors indicative of a corresponding region of an image of an object;

b) using electronic circuitry to generate a regional training set for codevector training, said regional training set comprising the plurality of data vectors of said regional data set and data vectors of a data subset adjacent to said regional data set in said continuous data flow;

c) using electronic circuitry to determine a plurality of codevectors through training for approximating each of the data vectors of the regional data set with a fidelity above a predetermined threshold, said plurality of codevectors being based on the data vectors contained in the regional training set to result in a plurality of trained codevectors;

d) using electronic circuitry to encode each of the data vectors of the regional data set using a codevector from said plurality of trained codevectors;

e) storing the plurality of trained codevectors in a regional codebook;

f) for each data vector of regional data set, storing in a regional index map an index indicative of a trained codevector's location within said regional codebook;

g) repeating steps a)-f) for each subsequent regional data set of said continuous data flow, wherein said data vectors are spectral data having multi-spectral data and wherein using said regional training set comprising the plurality of data vectors from said regional data set and data vectors of an adjacent data subject reduces artificial visual boundaries in a decompressed version of said image.

2. A method according to claim 1 wherein said method further includes the step of:

h) providing said regional codebook and said regional index map for transmission using said data transmission system wherein step i) is executed prior to executing step g).

3. A method according to claim 1 wherein, for each regional data set, said plurality of data vectors is separated into at least two clusters based on similarity of the data vectors such that similar vectors are grouped together into one of said at least two clusters.

4. A method according to claim 1 wherein steps d) and e) are executed using SAMVQ.

5. A method according to claim 1 wherein said plurality of data vectors are of a regional data cube of a continuous data flow and are data vectors received within a specified period of time.

6. A method for compressing multi-dimensional data of a continuous data flow and for use with data processing and data transmission systems, the method comprising:

a) receiving the multi-dimensional data at a first port of said data processing system, said multi-dimensional data comprising a first regional data set of said continuous data flow, said regional data set comprising a plurality of data vectors indicative of a corresponding region of an image of an object;

b) using electronic circuitry to generate a regional training set for codevector training, said regional training set comprising the plurality of data vectors of said first regional data set and a plurality of data vectors of a second regional data set, said second regional data set being a regional data set immediately preceding said first regional data set in said continuous data flow, said second regional data set being previously received prior to a reception of said first regional data set;

c) using electronic circuitry to determine a plurality of codevectors through training for approximating each of the data vectors of the first regional data set and of the second regional data set with a fidelity above a predetermined threshold, said plurality of codevectors being based on the data vectors contained in the first regional training set to result in a plurality of trained codevectors;

d) using electronic circuitry to encode each of the data vectors of the first regional data set and the second regional data set using a codevector from said plurality of trained codevectors;

e) storing the plurality of trained codevectors in a regional codebook;

f) for each data vector of said first regional data set, storing in a regional baseline index map an index indicative of a trained codevector's location within said first regional codebook;

g) for each data vector of said second regional data set, storing in a regional redundant index map an index indicative of a trained codevector's location within said regional codebook h) repeating steps a)-g) for each subsequent regional data set of said continuous data flow;

wherein said data vectors are spectral data having multi-spectral data and wherein using said regional baseline index map and said regional redundant index map provides for protection from data loss due to single bit errors.

7. A method according to claim 6 wherein said method further includes the step of:

i) providing said regional codebook, said regional baseline index map, and said regional redundant index map for transmission using said data transmission system wherein step i) is executed prior to executing step h).

8. A method according to claim 6 wherein, for each regional data set, said plurality of data vectors is separated into at least two clusters based on similarity of the data vectors such that similar vectors are grouped together into one of said at least two clusters.

9. A method according to claim 6 wherein steps c) and d) are executed using SAMVQ.

10. A method according to claim 6 wherein said plurality of data vectors are of a regional data cube of a continuous data flow and are data vectors received within a specified period of time.

* * * * *